(12) United States Patent
Su

(10) Patent No.: US 6,517,141 B1
(45) Date of Patent: Feb. 11, 2003

(54) WATER-PROOF CAR COVERING

(76) Inventor: Tsun-Cheng Su, No. 21, Alley 5, Lane 350, Lin 14, Chang-An Li, Kuang-Fu Rd., Ping-Tung City (TW)

( * ) Notice: Subject to any disclaimer, the term of this patent is extended or adjusted under 35 U.S.C. 154(b) by 0 days.

(21) Appl. No.: 10/062,793

(22) Filed: Jan. 31, 2002

(51) Int. Cl.[7] .................................................. B60J 7/20
(52) U.S. Cl. ....................................... 296/136; 150/166
(58) Field of Search ............................. 296/95.1, 96.12, 296/136; 150/166; 160/370.21

(56) References Cited

U.S. PATENT DOCUMENTS

| | | | | |
|---|---|---|---|---|
| 3,438,158 A | * | 4/1969 | Kane | 296/136 |
| 3,600,866 A | * | 8/1971 | Griffith | 296/136 |
| 4,635,996 A | * | 1/1987 | Hirose | 296/136 |
| 4,944,321 A | * | 7/1990 | Moyet-Ortiz | 296/136 |
| 5,497,819 A | * | 3/1996 | Chiang | 296/136 |
| 5,653,492 A | * | 8/1997 | Mills | 296/136 |
| 5,842,733 A | * | 12/1998 | Miller | 296/136 |
| 6,129,408 A | * | 10/2000 | Schultz et al. | 296/136 |

* cited by examiner

*Primary Examiner*—D. Glenn Dayoah
*Assistant Examiner*—Lori L Coletta
(74) *Attorney, Agent, or Firm*—Timothy J. Keefer; Wildman, Harrold, Allen & Dixon

(57) ABSTRACT

A water-proof car covering includes an integral water-proof plastic sheet having a base portion that is adapted to confine a bottom side of a car and that has a periphery, and a plurality of side portions that extend from the periphery of the base portion, that are adapted to confine the remaining sides of the car, and that respectively have peripheral side edges which are connected to form a continuous loop. A closure unit is secured to and extends along the entire length of the loop, and includes male and female interlocking members that are engageable with each other so as to permit water-tight enclosing of the car by the plastic sheet.

14 Claims, 6 Drawing Sheets

WATER-PROOF CAR COVERING

BACKGROUND OF THE INVENTION

This invention relates to a water-proof car covering that is capable of enclosing a car in order to prevent water from entering into the car.

The object of the present invention is to provide a water-proof car covering that is capable of enclosing a car in order to prevent water from entering into the car in case of a flood.

SUMMARY OF THE INVENTION

According to one aspect of the present invention, a water-proof car covering comprises: an integral water-proof plastic sheet including a base portion that is adapted to confine a bottom side of a car and that has a periphery, and a plurality of side portions that extend from the periphery of the base portion, that are adapted to confine the remaining sides of the car, and that respectively have peripheral side edges which are connected to form a continuous loop; and a closure unit secured to and extending along the entire length of the loop, and including male and female interlocking members that are engageable with each other so as to permit watertight enclosing of the car by the plastic sheet.

According to another aspect of the present invention, a water-proof car covering comprises: a plastic casing including a lower casing half having a lower base portion and a lower peripheral portion that is transverse to and that extends from a periphery of the lower base portion and that defines a looped top edge, the lower base portion being adapted to confine a bottom side of a car, the plastic casing further including an upper casing half having an upper base portion and an upper peripheral portion that is transverse to and that extends from a periphery of the upper base portion and that defines a looped bottom edge which conforms to the top edge, the upper base portion being adapted to confine a top side of the car, the upper and lower peripheral portions being adapted to cooperatively confine the remaining sides of the car; and a closure unit secured to and extending along the entire lengths of the top and bottom edges and including male and female interlocking members that are engageable with each other so as to permit watertight enclosing of the car by the casing.

BRIEF DESCRIPTION OF THE DRAWINGS

In drawings which illustrate embodiments of the invention.

DETAILED DESCRIPTION OF THE PREFERRED EMBODIMENTS

Figure 1:
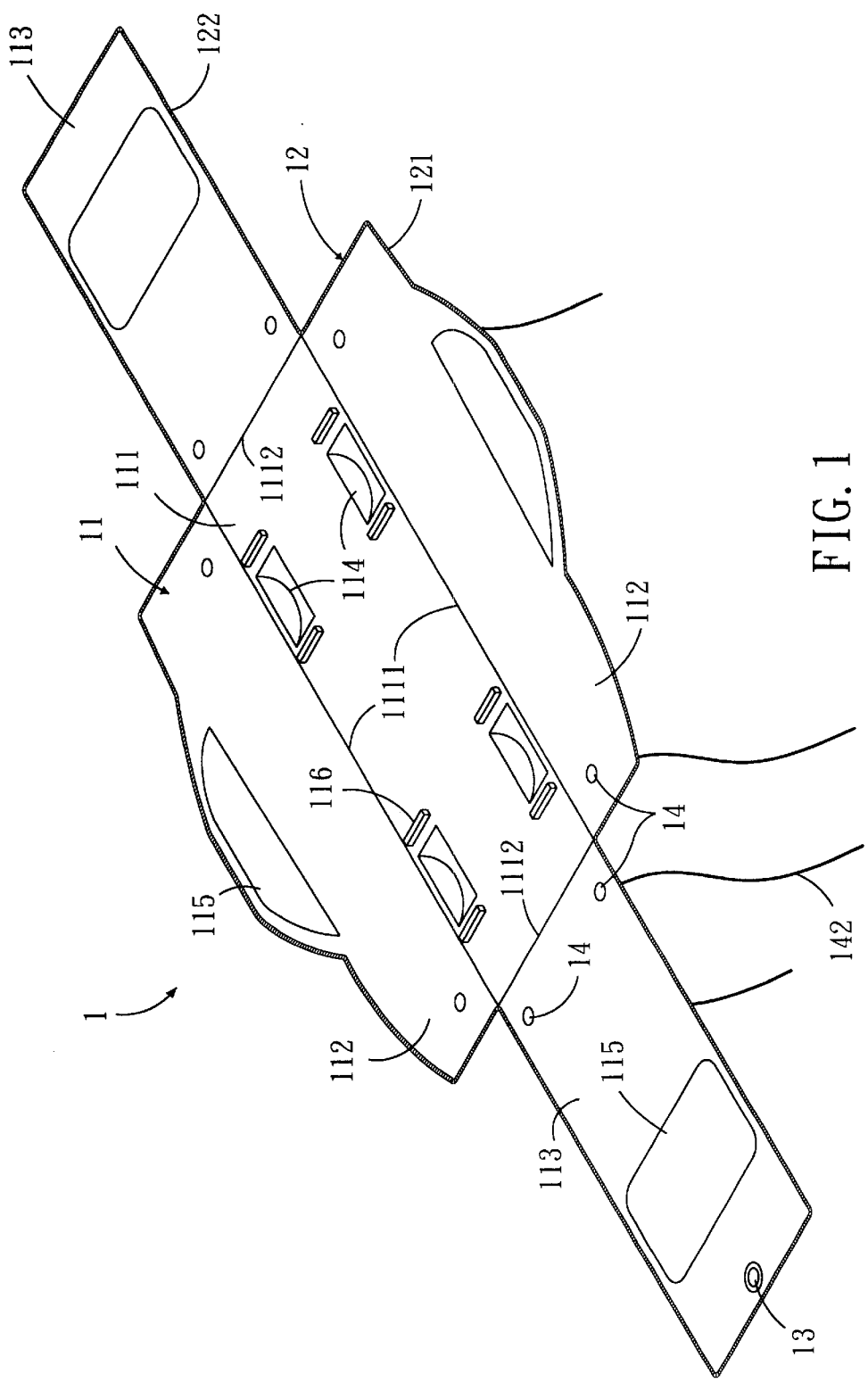
FIG. 1 is a perspective view of a first embodiment of a water-proof car covering in a spread-out state.
Figure 2:
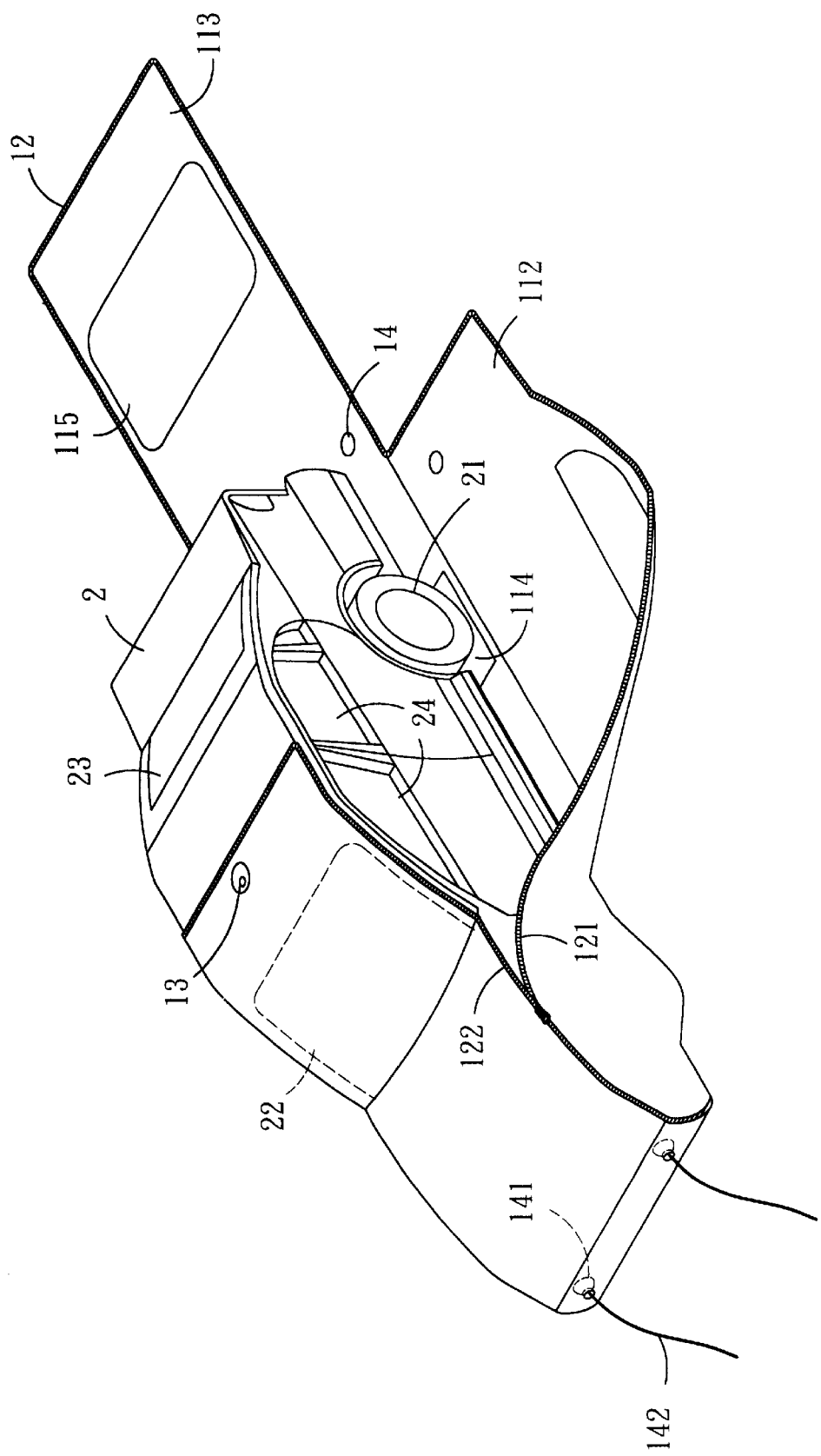
FIG. 2 is a perspective view illustrating how the water-proof car covering of FIG. 1 is used to enclose a car.

FIGS. 1 and 2 illustrate a first embodiment of a water-proof car covering 1 of this invention for a car 2.

The water-proof car covering 1 includes: an integral water-proof plastic sheet 11 having a base portion 111 that is adapted to confine a bottom side of the car 2 (see FIG. 2) and that has a periphery, and a plurality of side portions (112, 113) that extend from the periphery of the base portion 111, that are adapted to confine the remaining sides of the car 2, and that respectively have peripheral side edges which are connected to form a continuous loop; and a closure unit 12 secured to and extending along the entire length of the loop, and including male and female interlocking members (121, 122) that are engageable with each other so as to permit watertight enclosing of the car 2 by the plastic sheet 11. The closure unit 12 is a zipper in this embodiment.

The base portion 111 is rectangular in shape and has left and right sides 1111 and front and rear sides 1112 that cooperatively define the periphery of the base portion 111. The side portions (112, 113) have left and right side portions 112 and front and rear side portions 113 that respectively extend from the left and right sides 1111 and front and rear sides 1112 of the base portion 111. The left and right side portions 112 are adapted to confine left and right sides of the car 2. The front and rear side portions 113 are adapted to confine front and rear sides and a top side of the car 2.

A plurality of cushioning pads 115 are respectively secured to the left and right and front and rear side portions 112, 113 of the plastic sheet 11, and are adapted to protect left and right and front and rear windows (24, 22, 23) of the car 2 from external impact.

A plurality of positioners are secured to and project from the base portion 111, and are adapted to position wheels 21 of the car 2, respectively. Each of the positioners has a pair of spaced apart front and rear curbs 116 that are adapted to engage a respective one of the wheels 21 of the car 2 so as to arrest frontward and backward movements of the car 2. Four pockets 114 are formed on the base portion 111. Each pocket 114 is disposed between the front and rear curbs 116 of a respective positioner, and is adapted to receive a respective one of the wheels 21 of the car 2.

A plurality of attaching members 14 are secured to the side portions (112, 113) of the plastic sheet 11, and are adapted to be detachably attached to the car 2. Each of the attaching members 14 includes a suction cup 141. A plurality of strings 142 are securely connected to the attaching members 14, respectively.

A valve member 13 is mounted on the front side portion 113 of the plastic sheet 11 so as to permit discharge of air trapped in a gap between the plastic sheet 11 and the car 2 that is enclosed by the plastic sheet 11.

Figure 3:
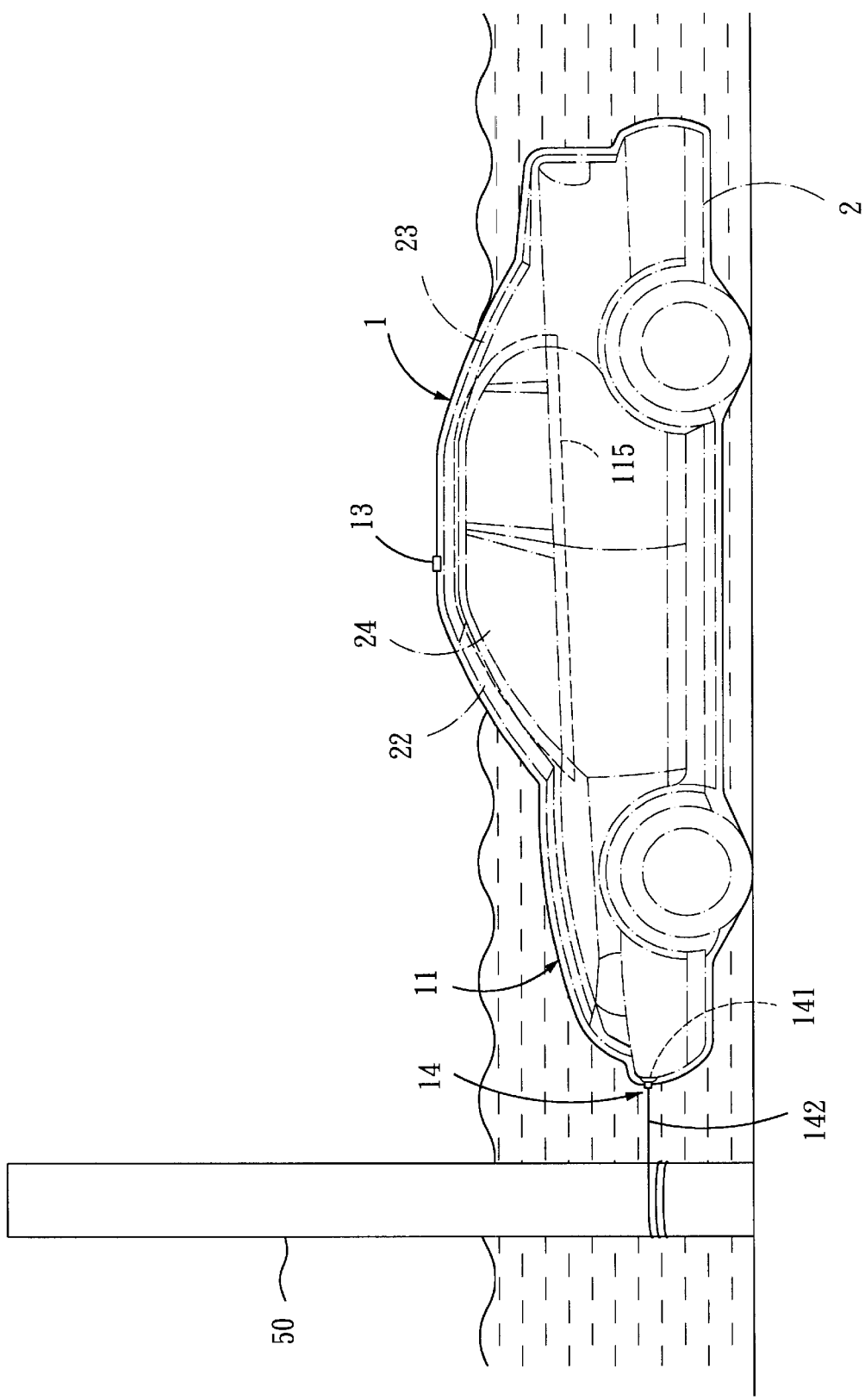
FIG. 3 is a side view illustrating how the car closed by the water-proof car covering of FIG. 1 can be fastened to a post in case of a flood.

Referring to FIG. 3, the car 2 can be enclosed by the plastic sheet 11 in order to protect the car 2 from a flood, and can be fastened to a fixed erection, such as a post 50, via the strings 142 in order to prevent drifting of the car 2.

Figure 4:
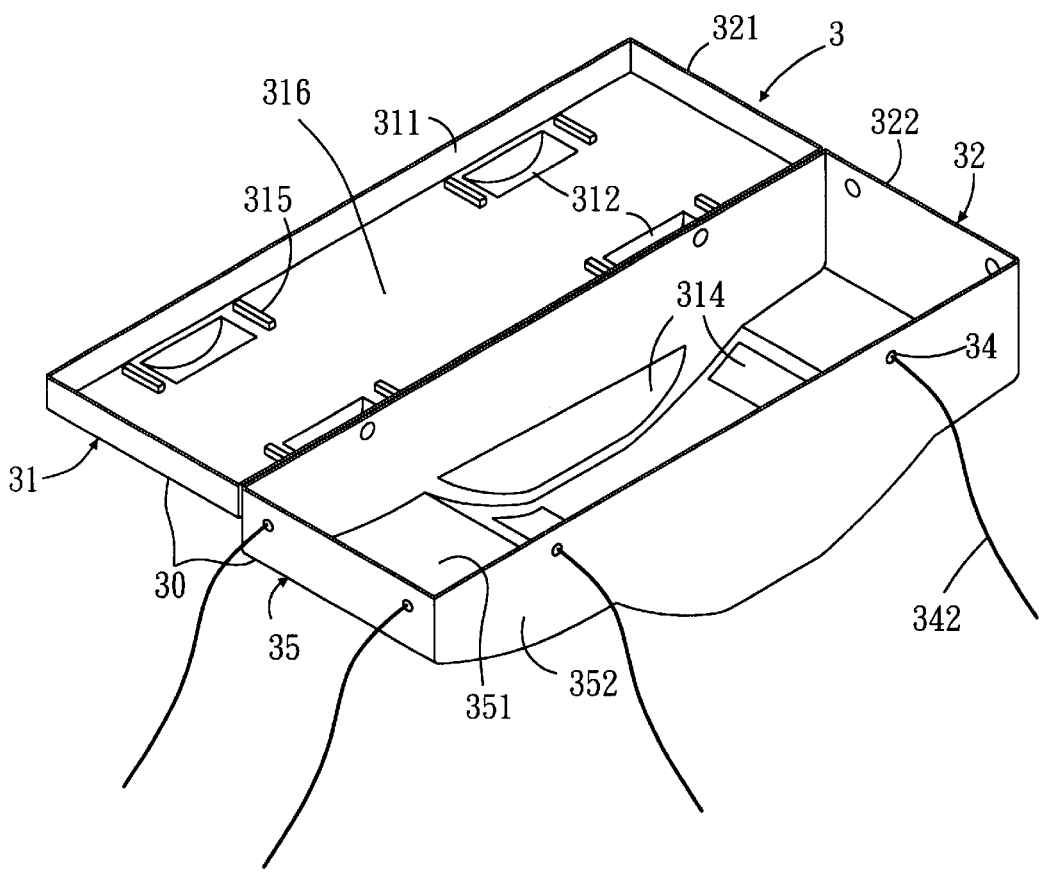
FIG. 4 is a perspective view of a second embodiment of a water-proof car covering.
Figure 5:
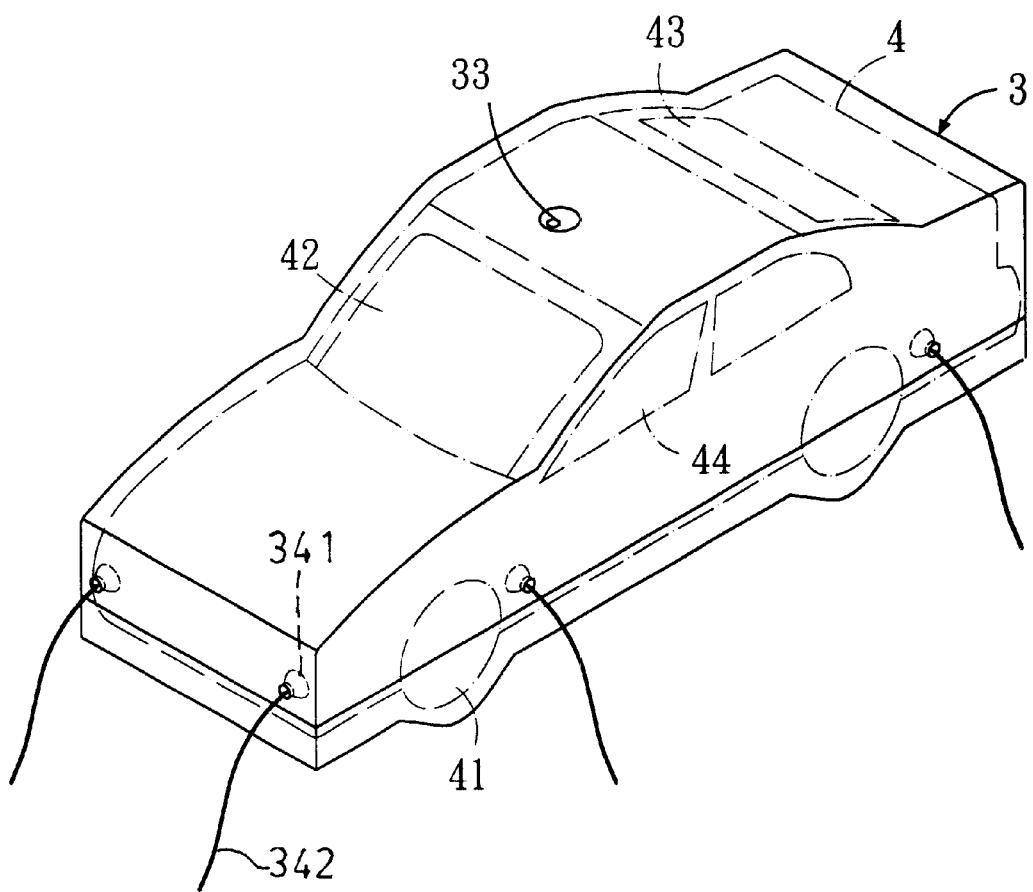
FIG. 5 is a perspective view illustrating how the water-proof car covering of FIG. 4 is used to enclose a car.

FIGS. 4 and 5 illustrate a second embodiment of a water-proof car covering 3 of this invention for a car 4.

The water-proof car covering 3 includes: a plastic casing 30 which includes a lower casing half 31 having a lower base portion 316 and a lower peripheral portion 311 that is transverse to and that extends from a periphery of the lower base portion 316 and that defines a looped top edge, the lower base portion 316 being adapted to confine a bottom side of the car 4, the plastic casing 30 further including an upper casing half 35 having an upper base portion 351 and an upper peripheral portion 352 that is transverse to and that extends from a periphery of the upper base portion 351 and that defines a looped bottom edge which conforms to the top edge, the upper base portion 351 being adapted to confine a top side of the car 4, the upper and lower peripheral portions 352, 316 being adapted to cooperatively confine the remaining sides of the car 4; and a closure unit 32 secured to and extending along the entire lengths of the top and bottom edges and including male and female interlocking members (321, 322) that are engageable with each other so as to permit watertight enclosing of the car 4 in the casing 30. The closure unit 32 is a zipper in this embodiment.

In the lower base portion 316 of the lower casing half 31 is rectangular in shape. The water proof car covering 3 further includes a plurality of positioners secured to and projecting from the lower base portion 316 and adapted to position wheels 41 of the car 4, respectively. Each of the positioners has a pair of spaced apart front and rear curbs 315 that are adapted to engage a respective one of the wheels 41 of the car 4 so as to arrest frontward and backward movements of the car 4. Four pockets 312 are formed to engage a respective one of the wheels 41 of the car 4.

The upper base portion 351 of the upper casing half 35 is generally rectangular in shape. The upper peripheral portion 352 has two opposite sides. The water-proof car covering 3 further includes a plurality of cushioning pads 314 which are respectively secured to the upper base portion 351 and the opposite sides of the upper peripheral portion 352 and which are adapted to protect left and right and front and rear windows (44, 42, 43) of the car 4 from external impact.

A plurality of attaching members 34 are secured to the upper peripheral portion 352, and are adapted to be detachably attached to the car 4. Each attaching member 34 includes a suction cup 341. A plurality of strings 342 are securely connected to the attaching members 34, respectively.

A valve member 33 is selectively mounted on one of the upper and lower casing halves 35, 31 so as to permit discharge of air trapped in a gap among the upper and lower casing halves 35, 31 and the car 4 that is enclosed by the upper and lower casing halves 35, 31. The valve member 33 is preferably mounted on the upper casing half 35.

Figure 6:
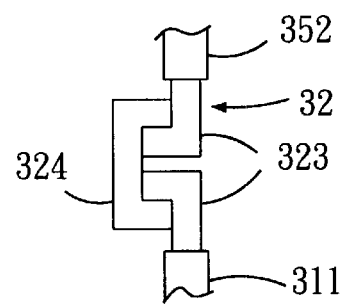
FIGS. 6 and 7 are fragmentary side views illustrating different configurations of a closure unit of the water-proof car covering of FIG. 4.
Figure 7:
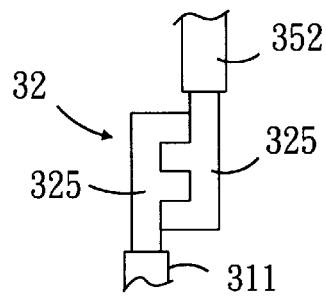

Structures other than a zipper can be used for the closure unit 32, as best illustrated in FIGS. 6 and 7. In FIG. 6, the closure unit 32 includes a pair of L-shaped male interlocking members 323 respectively secured to and extending along the top edge of the lower casing half 31 and the bottom edge of the upper casing half 35, and a rubber female interlocking member 324 that engages resiliently and sealingly the male interlocking members 323. In FIG. 7, the closure unit 32 includes a pair of rubber F-shaped interlocking members 325 respectively secured to and extending along the top edge of the lower casing half 31 and the bottom edge of the upper casing half 35, and resiliently and sealingly engaging each other.

Figure 8:
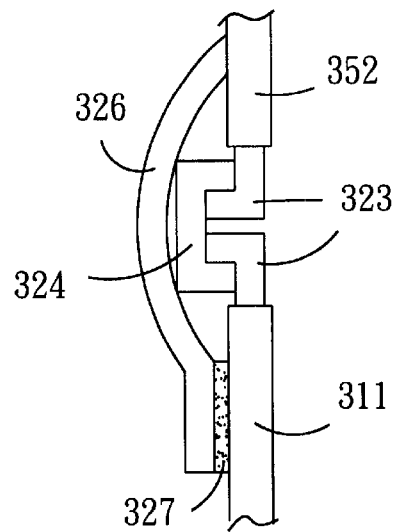
FIG. 8 is a fragmentary side view illustrating how a cover strip is used to enclose the closure unit of FIG. 6.

With reference to FIG. 8, in combination with FIGS. 4 and 6, a water-proof plastic cover strip 326 can be used to enclose the closure unit 32. The cover strip 326 spans the male and female interlocking members 324, 323, and has two opposite sides. One of the opposite sides of the cover strip 326 is selectively secured to and extend along the entire length of one of the top edge of the lower casing half 31 and the bottom edge of the upper casing half 35 at one side of the male and female interlocking members 324, 323. A hook-and-loop fastener 327 is secured to and extends along the entire length of the other one of the opposite sides of the cover strip 326 and the other one of the top edge of the lower casing half 31 and the bottom edge of the upper casing half 35 so as to permit securing of the other one of the opposite sides of the cover strip 326 to the other one of the top edge of the lower casing half 31 and the bottom edge of the upper casing half 35 at the other side of the male and female interlocking members 324, 323, thereby permitting the cover strip 326 to enclose the enclosure unit 32.

With the invention thus explained, it is apparent that various modifications and variations can be made without departing from the spirit of the present invention. It is therefore intended that the invention be limited only as recited in the appended claims.

I claim:

1. A water-proof car covering, comprising:
   an integral water-proof plastic sheet including a base portion that is adapted to confine a bottom side of a car and that has a periphery, and a plurality of side portions that extend from said periphery of said base portion, that are adapted to confine remaining sides of the car, and that respectively have peripheral side edges which are connected to form a continuous loop; and
   a closure unit secured to and extending along entire length of said loop, and including male and female interlocking members that are engageable with each other so as to permit watertight enclosing of the car by said plastic sheet.

2. The water-proof car covering of claim 1, wherein said base portion is rectangular in shape and has left and right sides and front and rear sides that cooperatively define said periphery of said base portion, said side portions including left and right side portions and front and rear side portions that respectively extend from said left and right sides and said front and rear sides of said base portion, said left and right side portions being adapted to confine left and right sides of the car, said front and rear side portions being adapted to confine front and rear sides and a top side of the car.

3. The water-proof car covering of claim 2, further comprising a plurality of cushioning pads which are respectively secured to said left and right and front and rear side portions of said plastic sheet and which are adapted to protect left and right and front and rear windows of the car from external impact.

4. The water-proof car covering of claim 1, further comprising a plurality of positioners secured to and projecting from said base portion and adapted to position wheels of the car, respectively, each of said positioners having a pair of spaced apart front and rear curbs that are adapted to engage a respective one of the wheels of the car so as to arrest frontward and backward movements of the car.

5. The water-proof car covering of claim 1, further comprising a plurality of attaching members that are secured to said side portions of said plastic sheet and that are adapted to be detachably attached to the car, and a plurality of strings securely connected to said attaching members, respectively.

6. The water-proof car covering of claim 1, wherein said closure unit is a zipper.

7. The water-proof car covering of claim 1, further comprising a valve member mounted on said plastic sheet so as to permit discharge of air trapped in a gap between said plastic sheet and the car that is enclosed by said plastic sheet.

8. A water-proof car covering, comprising:
   a plastic casing including a lower casing half having a lower base portion and a lower peripheral portion that is transverse to and that extends from a periphery of said lower base portion and that defines a looped top edge, said lower base portion being adapted to confine a bottom side of a car, said plastic casing further including an upper casing half having an upper base portion and an upper peripheral portion that is transverse to and that extends from a periphery of said upper base portion and that defines a looped bottom edge which conforms to said top edge, said upper base portion being adapted to confine a top side of the car, said upper and lower peripheral portions being adapted to cooperatively confine remaining sides of the car; and a closure unit secured to and extending along entire lengths of said top and bottom edges and including male and female interlocking members that are engageable with each other so as to permit watertight enclosing of the car by said casing.

9. The water-proof car covering of claim 8, wherein said lower base portion of said lower casing half is rectangular in shape, said water-proof car covering further comprising a plurality of positioners secured to and projecting from said lower base portion and adapted to position wheels of the car, respectively, each of said positioners having a pair of spaced apart front and rear curbs that are adapted to engage a respective one of the wheels of the car so as to arrest frontward and backward movements of the car.

10. The water-proof car covering of claim 9, wherein said upper base portion of said upper casing half is generally rectangular in shape, said upper peripheral portion having two opposite sides, said water-proof car covering further comprising a plurality of cushioning pads which are respectively secured to said upper base portion and said opposite sides of said upper peripheral portion and which are adapted to protect left and right and front and rear windows of the car from external impact.

11. The water-proof car covering of claim 8, further comprising a plurality of attaching members that are secured to said upper peripheral portion and that are adapted to be detachably attached to the car, and a plurality of strings securely connected to said attaching members, respectively.

12. The water-proof car covering of claim 8, wherein said closure unit is a zipper.

13. The water-proof car covering of claim 8, wherein said closure unit further includes a water-proof plastic cover strip that spans said male and female interlocking members and that has two opposite sides, one of said opposite sides of said cover strip being selectively secured to and extending along the entire length of one of said top and bottom edges at one side of said male and female interlocking members, said closure unit further including a hook-and-loop fastener that is secured to and that extends along the entire length of the other one of said opposite sides of said cover strip and the other one of said top and bottom edges so as to permit securing of the other one of said opposite sides of said cover strip to the other one of said top and bottom edges at the other side of said male and female interlocking members, thereby permitting said cover strip to enclose said enclosure unit.

14. The water-proof car covering of claim 8, further comprising a valve member selectively mounted on one of said upper and lower casing halves so as to permit discharge of air trapped in a gap among said upper and lower casing halves and the car that is enclosed by said upper and lower casing halves.

* * * * *